United States Patent
Yee et al.

(10) Patent No.: US 9,110,923 B2
(45) Date of Patent: Aug. 18, 2015

(54) RANKING OVER HASHES

(75) Inventors: Yangli Hector Yee, Sunnyvale, CA (US); Sergey Ioffe, Mountain View, CA (US); Samy Bengio, Mountain View, CA (US)

(73) Assignee: Google Inc., Mountain View, CA (US)

( * ) Notice: Subject to any disclaimer, the term of this patent is extended or adjusted under 35 U.S.C. 154(b) by 926 days.

(21) Appl. No.: 13/040,168

(22) Filed: Mar. 3, 2011

(65) Prior Publication Data

US 2015/0169633 A1     Jun. 18, 2015

(51) Int. Cl.
G06F 17/30 (2006.01)
G06F 15/16 (2006.01)

(52) U.S. Cl.
CPC ...... *G06F 17/30247* (2013.01); *G06F 17/3028* (2013.01); *G06F 17/30253* (2013.01)

(58) Field of Classification Search
CPC .......... G06F 17/30247; G06F 17/3028; G06F 17/30253
See application file for complete search history.

(56) References Cited

U.S. PATENT DOCUMENTS

| 6,263,089 | B1 * | 7/2001 | Otsuka et al. ............... 382/107 |
| 8,478,052 | B1 | 7/2013 | Yee et al. |
| 8,515,212 | B1 | 8/2013 | Bengio et al. |
| 2004/0025025 | A1 * | 2/2004 | Venkatesan et al. .......... 713/176 |
| 2005/0120311 | A1 * | 6/2005 | Thrall ........................... 715/811 |
| 2006/0195406 | A1 * | 8/2006 | Burges et al. ................... 706/12 |
| 2008/0097981 | A1 * | 4/2008 | Williams et al. .................. 707/5 |
| 2009/0060351 | A1 * | 3/2009 | Li et al. ........................ 382/224 |
| 2009/0182730 | A1 * | 7/2009 | Krishnamoorthy et al. ...... 707/5 |

OTHER PUBLICATIONS

Datar et al., Locality-Sensitive Hashing Scheme Based on P-Stable Distributions, *In Proceedings of the Twentieth Annual Symposium on Computational Geometry*, Jun. 2004, 253-262.

* cited by examiner

*Primary Examiner* — Tarek Chbouki
(74) *Attorney, Agent, or Firm* — Fish & Richardson P.C.

(57) ABSTRACT

Methods, systems, and apparatus, including computer programs encoded on a computer storage medium, for training an image ranking model to rank images based on hashes of their contents using a lookup table. An image training set is received. An image ranking model is trained with the training set by generating an image hash for each image of the ordered pair of images based on one or more features extracted from the image, computing a first score for a first image hash of a first image of the pair and a second score for a second image hash of a second image of the pair using the image ranking model, determining whether to update the image ranking model based on the first score and the second score, and updating the image ranking model using an update value based on the first score and the second score.

18 Claims, 7 Drawing Sheets

Hash Character

|  | a | b | c | ... |
|---|---|---|---|---|
| 0 | $W_{a,0}$ | $W_{b,0}$ | $W_{c,0}$ | ... |
| 1 | $W_{a,1}$ | $W_{b,1}$ | $W_{c,1}$ | ... |
| 2 | $W_{a,2}$ | $W_{b,2}$ | $W_{c,2}$ | ... |
| ... | ... | ... | ... | ... |

Position

RANKING OVER HASHES

BACKGROUND

This specification relates to information retrieval.

Conventional information retrieval systems are used to identify a wide variety of resources, for example, images, audio files, web pages, or documents, e.g., news articles. Additionally, search results presented to a user and identifying particular resources responsive to a query are typically ranked according to particular criteria.

SUMMARY

The ranking of search results typically describes a relevance of each identified resource to a query. Rankings can also represent generalizations of other given orderings in relation to a query.

A ranking model can be trained based on a training set of ordered document pairs. The ranking model can be used to compute a score for each document in a collection of documents for a given query. A hash function can convert the contents of a document into a sequence of hash characters, where each hash character corresponds to a bit string. For an image, the hash can be based upon histogram data generated for the resource. The score computed by the ranking model can be based, in part, on the characters of a hash generated by a hash function. Documents can then be ordered based on the score generated by the ranking model. This specification describes systems and techniques for ranking documents by using hashes of their contents.

A particular ranking model can be trained using a collection of ordered training pairs of images. Separate ranking models can be constructed independently for each collection of ordered training pairs. Each image in the collection can be converted into one or more hash values using one or more respective hash functions. The ranking model can use a lookup table to calculate a score for each image by using the hashes of the images. Hash characters in each image hash and their respective positions in the image hash can be used as indices into the lookup table. Lookup table values can be accumulated into a score for each image.

In general, one innovative aspect of the subject matter described in this specification can be embodied in methods that include the actions of receiving an image training set, the image training set comprising one or more ordered pairs of images where an ordered pair of images is a pair of images where a first image in the pair is indicated to have a higher score than a second image in the pair; and training an image ranking model, wherein the training includes, for each ordered pair of images, generating an image hash for each image of the ordered pair of images based on one or more features extracted from the image; computing a first score for a first image hash of a first image of the pair and a second score for a second image hash of a second image of the pair using the image ranking model; determining whether to update the image ranking model based on the first score and the second score; and updating the image ranking model using an update value based on the first score and the second score. Other embodiments of this aspect include corresponding systems, apparatus, and computer programs, configured to perform the actions of the methods, encoded on computer storage devices.

These and other embodiments can optionally include one or more of the following features. Determining whether to update the image ranking model includes computing a difference between the first score and the second score and comparing the difference to a threshold. The update value is based on a number of hash characters that match between the first image hash and the second image hash. Updating the image ranking model includes computing a ranking loss using the first score and the second score; computing the update value using the ranking loss; and updating one or more weights of the image ranking model using the update value. The ranking loss is a degree of error for a pair of incorrectly-ranked images. The ranking loss is based on the difference between the first score and the second score. The ranking loss is computed as a maximum between zero and a margin minus the difference between the first score and the second score, wherein the margin is a ranking margin. The update value is calculated as the ranking loss divided by: a length of the first hash plus a length of the second hash minus twice a number of hash characters that match between the first hash and the second hash at respective hash character positions. The update value has a maximum value, wherein if the calculated update value is more than the maximum value, the update value is set to the maximum value. Computing a score for an image hash includes using a lookup table. Each image hash comprises a sequence of hash characters, where each hash character corresponds to a bit string. Computing the score from the lookup table includes looking up a lookup table value corresponding to each of a plurality of hash characters of an image hash. Computing the score from the lookup table includes summing the lookup table value corresponding to each of the plurality of hash characters of the image hash. Looking up a lookup table value includes using a hash character value of the image hash and a hash character position of the image hash as indices to the lookup table. Updating the image ranking model includes updating a plurality of lookup table values. Updating the lookup table values includes adding a weight adjustment to a plurality of lookup table values, each lookup table value located at a position in the lookup table corresponding to a hash character value in the first image hash and a hash character position in the first image hash. Updating the lookup table values includes subtracting a weight adjustment to a plurality of lookup table values, each lookup table value located at a position in the lookup table corresponding to a hash character value in the second image hash and a hash character position in the second image hash. The higher score indicates that the first image in the pair is more relevant to a text query than the second image in the pair. The higher score indicates that the first image in the pair is more similar to a query image than the second image in the pair.

Another innovative aspect of the subject matter described in this specification can be embodied in methods that include the actions of receiving a search query; identifying a lookup table corresponding to the search query; for each image in a collection of images: generating an image hash for the image based on one or more features extracted from the image, wherein the image hash comprises one or more hash characters, and computing a score for the image hash using the lookup table, where a first index to the lookup table corresponds to a value of each hash character, and a second index to the lookup table corresponds to a position of each hash character in the image hash; ordering the images by the score of each image; and providing the ordered images as a search result. Other embodiments of this aspect include corresponding systems, apparatus, and computer programs, configured to perform the actions of the methods, encoded on computer storage devices.

These and other embodiments can optionally include one or more of the following features. Computing a score for the hash includes summing a lookup table value for each of a plurality of hash characters of the image hash. Summing a lookup table value for each of a plurality of hash characters of the image hash includes identifying a lookup table value for each hash character by using the first index and second index. Each hash character corresponds to a bit string. The search query is a text query and the ordered images represent a relevance of each image to the text query. The search query is an image query and the ordered images represent a similarity of each image to the image query.

Particular embodiments of the subject matter described in this specification can be implemented so as to realize one or more of the following advantages. A hash of image features is significantly smaller than a feature vector used by some other ranking techniques. Storing hashes instead of feature vectors therefore requires less storage space. Additionally, system performance is improved because computing the score of a hash by a lookup table is faster than computing a dot product between feature vectors and a weight vector, as used by some other ranking techniques. Using a representation of an image generated by a hash function also provides a non-linearity that allows more complicated decision boundaries to be learned, which can achieve better classification and ranking.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
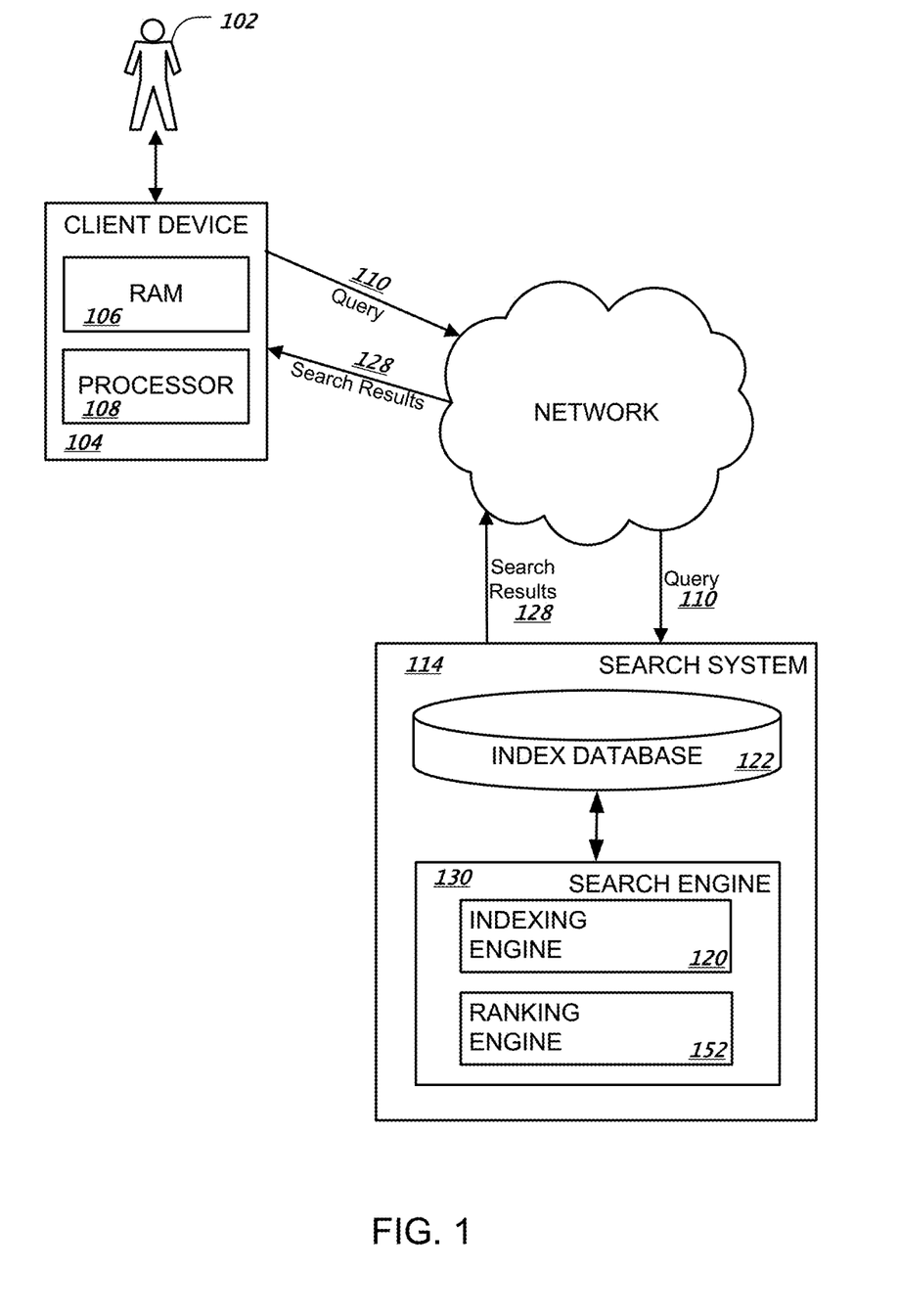
FIG. 1 shows an example search system for providing search results relevant to submitted queries.

FIG. 1 shows an example search system 114 for providing search results relevant to submitted queries as can be implemented in an internet, an intranet, or another client and server environment. The search system 114 is an example of an information retrieval system in which the systems, components, and techniques described below can be implemented.

A user 102 can interact with the search system 114 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 that indexes resources (e.g., web pages, images, or news articles on the Internet) found in a collection of resources, an index database 122 that stores the index information, and a ranking engine 152 (or other software) to rank the resources that match the query 110. The indexing and ranking of the resources can be performed using conventional techniques. The search engine 130 can transmit the search results 128 through the network to the client device 104 for presentation to the user 102.

Figure 2:
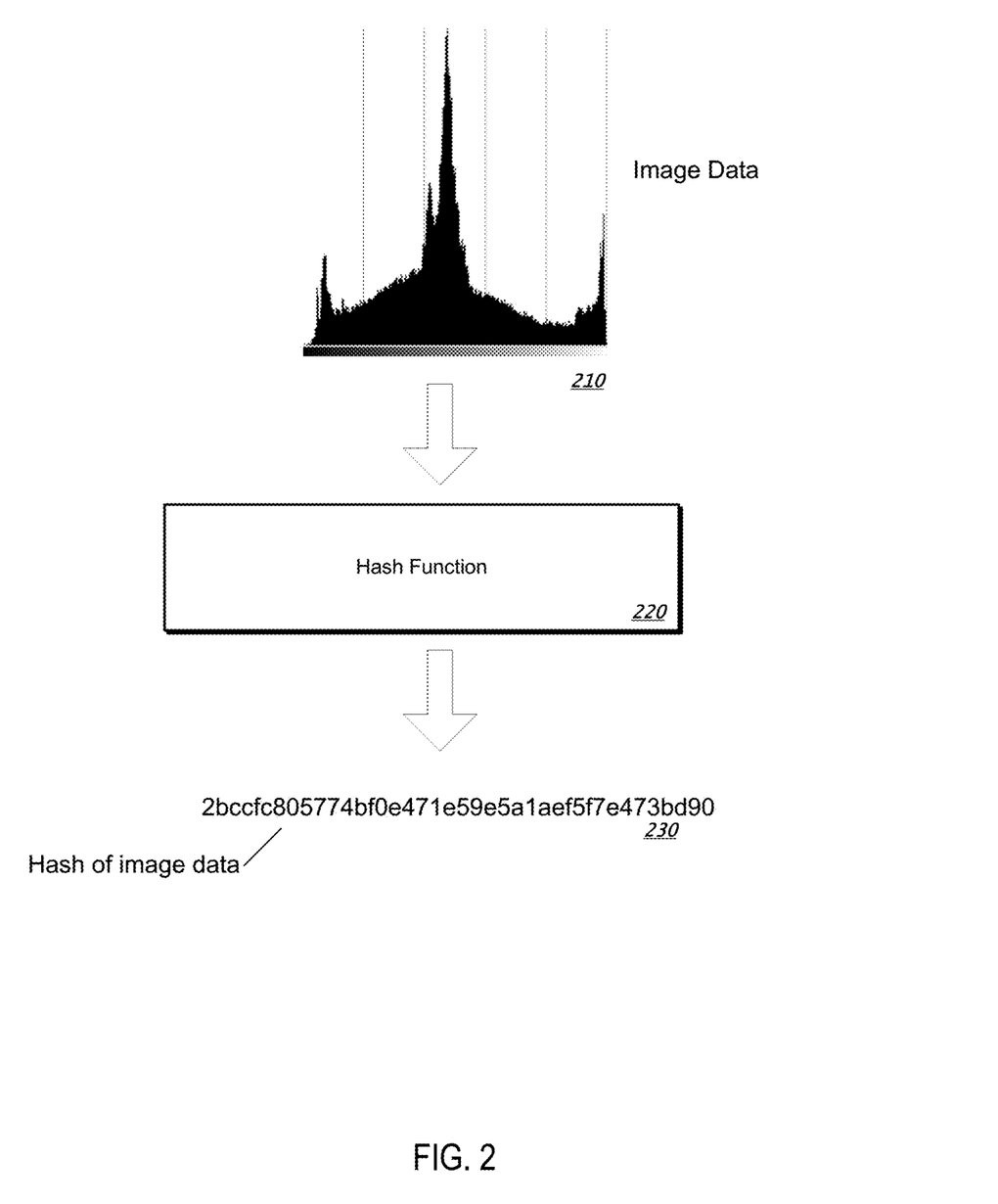
FIG. 2 is a block diagram showing an input and output of an example hash function.

FIG. 2 is a diagram depicting an input and output of an example hash function 220. In particular, FIG. 2 shows image data as the input to the hash function 210. Features of an image can be extracted into a feature representation. Features of an image can include, for example, histograms of image color or grayscale data, edges, corners, image centers of gravity, or other image points of interest. The hash function 220 receives the feature representation of the image and converts this data into an output hash 230. The histogram 210 of the image is an example of an extracted feature. Multiple other features can also be extracted and combined into the feature representation for the image. The hash 230 is a sequence of hash characters. Each hash character can correspond to a bit string and can be represented in various character encodings, for example, hexadecimal or Base64. The hash can be of a fixed or variable size. In some implementations, the hash is a concatenation of the output of multiple hash functions. Hashes for other kinds of resources can similarly be computed with hash functions.

Figure 3:
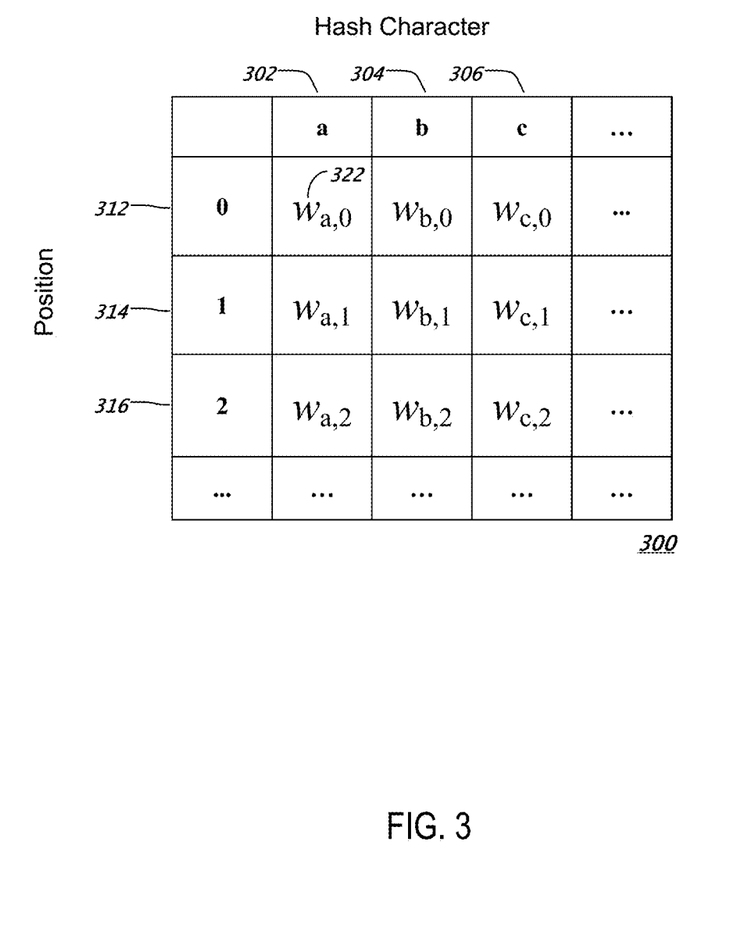
FIG. 3 is a diagram of an example lookup table with columns corresponding to hash characters and rows corresponding to hash character positions.

FIG. 3 is a diagram of an example lookup table 300 with columns corresponding to hash characters and rows corresponding to hash character positions. For example, a score for hash 230 of FIG. 2 can be calculated using lookup table 300.

In some implementations, the columns of lookup table 300 (e.g., columns 302, 304, and 306) correspond to the each of the hash characters that can form a hash. The characters that can form a hash depend on the character encoding used to represent the bit string corresponding to each hash character. For example, if Base64 encoding is used, the columns of the lookup table will correspond to upper case characters A-Z, lower case characters a-z, numerals 0-9, and symbols "+" and "/". For example, column 302 of lookup table 300 corresponds to the character "a". In an example Base64 character encoding, the hash character "a" corresponds to the bit string 11010. The rows 312, 314, 316, etc., of lookup table 300 correspond to the positions of each hash character. The position of a hash character refers to that character's location in the sequence of hash characters. For example, row 312 of lookup table 300 corresponds to position 0, in other words, the first position.

The data stored in lookup table 300 includes a matrix of weights 322. In some implementations, each weight is a real number learned by a trained ranking model.

Figure 4:
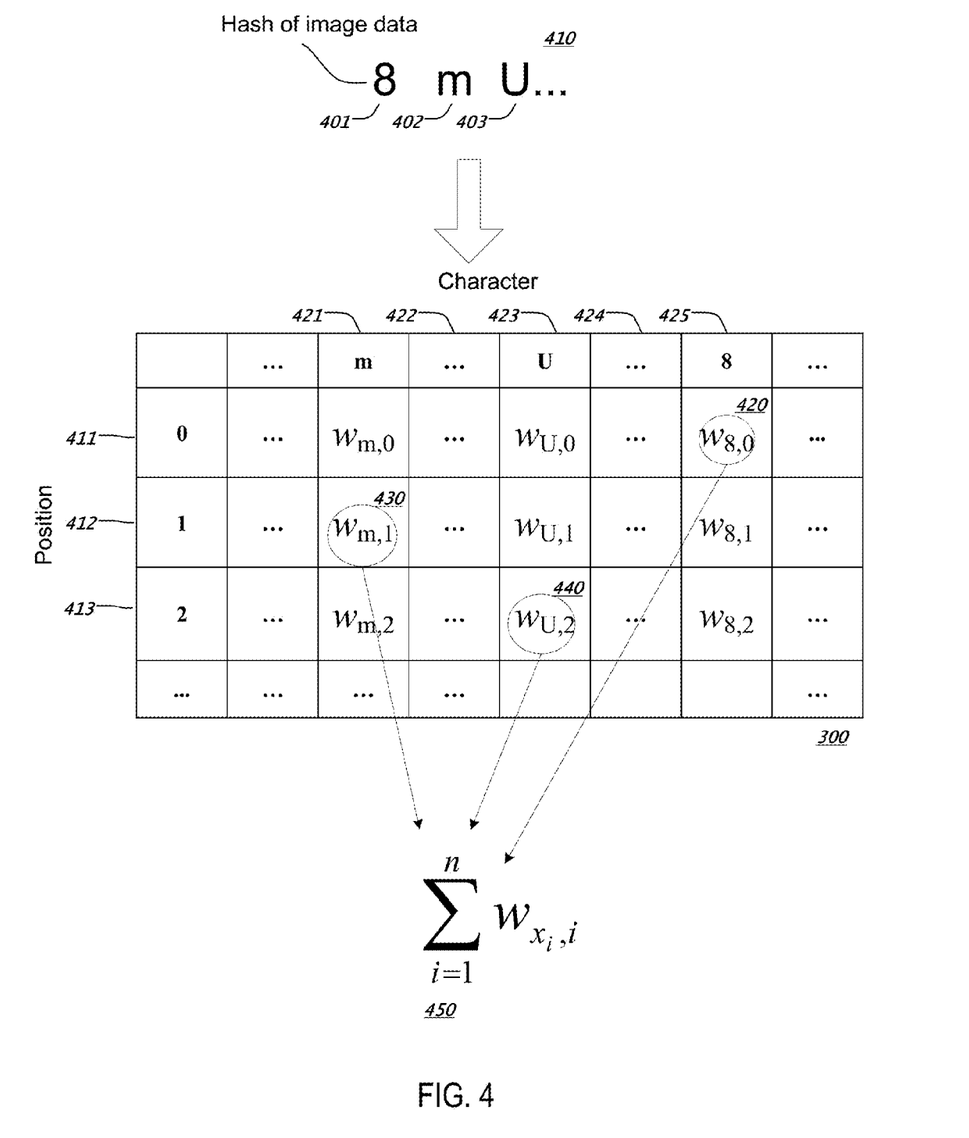
FIG. 4 is a diagram illustrating an example implementation of a lookup table.

FIG. 4 is a diagram illustrating an example implementation of a lookup table.

An input hash 410 can be formed by a string of hash characters. Each hash character in the input hash 410 and its corresponding position in the input hash 410 are used as inputs to the lookup table 300. Columns 421, 422, 423, 424, and 425 correspond to each of the hash characters that can form a hash. Rows 411, 412, and 413 correspond to positions of each hash character.

For example, FIG. 4 shows the first three characters of a sample input hash 410. The first hash character 401 is "8" in position 0. The hash character "8" and its respective position 0 are used as indices to lookup table 300 to retrieve the weight 420 corresponding to entry ["8", 0]. The other weights 430 and 440 for hash character 402 ("m" at position 1) and hash character 403 ("U" at position 2) are also retrieved and added to the running sum of weights 450. The remaining hash character values and their respective positions can also be retrieved and added to the running sum. As a result, the total score for the sample hash 410 can be represented by the sum:

$$\sum_{i=1}^{n} w_{x_i,i},$$

where $w_{x,i}$ is the lookup table weight at lookup table indices [x, i], where i is a hash position for a hash of length n, and $x_i$ is a hash character at position i.

Figure 5:
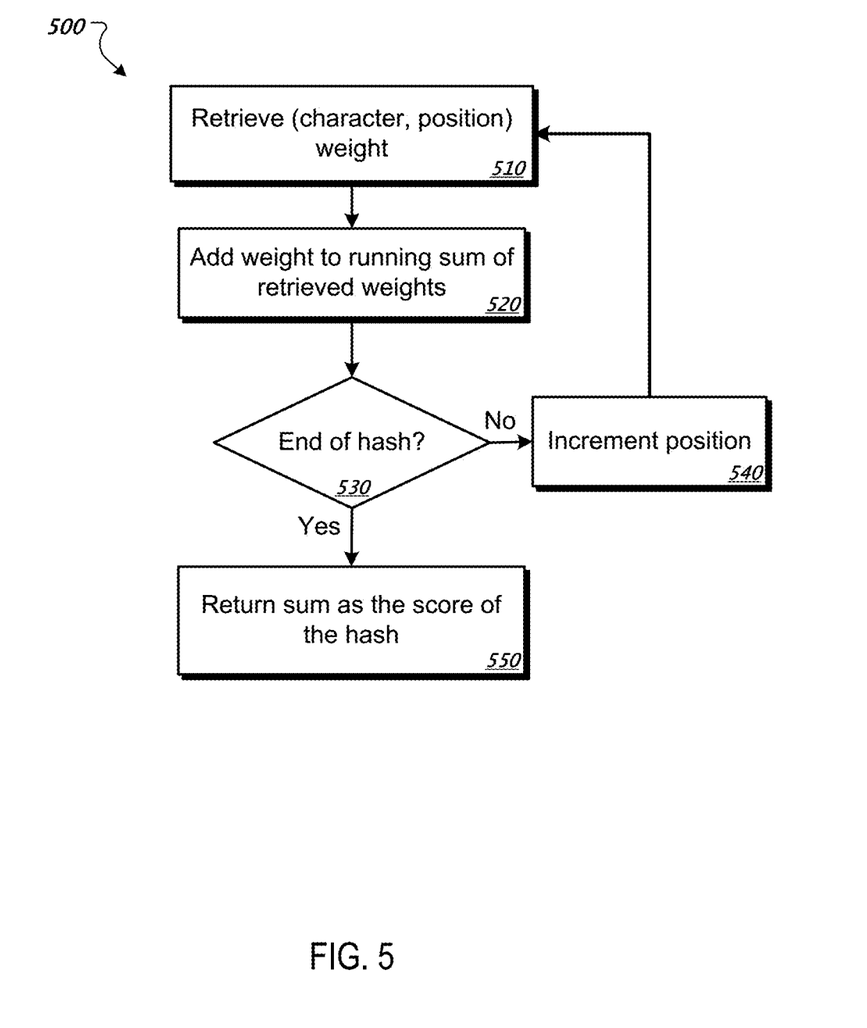
FIG. 5 is a flowchart of an example process for calculating a score for a hash using a lookup table.

FIG. 5 is a flowchart of an example process 500 for calculating a score for a hash using a lookup table. The process will be described as being performed by a computer system that includes one or more computers, e.g., the ranking engine described above. The system takes as input a hash corresponding to a document (e.g., an image).

The system retrieves from the lookup table a weight for a hash character of the input hash (510). Using the example shown in FIG. 4 for clarity, the hash character position can be used as the row index 411, and the hash character value can be used as the column index 425 into lookup table 300. In this case, ["8", 0] would be used as indices to lookup table 300 because "8" is the hash character value in the first position 401 of the input hash 410. As a result, weight 420 would be retrieved.

The system adds the retrieved weight to a running sum of weights so far retrieved (520). The system determines if more hash characters remain (530). If no hash characters remain, the process 500 returns the running sum as the score for the input hash (550). If more hash characters remain, the current hash character position is incremented (540) and the process 500 returns to 510 to retrieve the next weight corresponding to the next character of the input hash. For example, as shown in FIG. 4, the next weight 430 in the input hash 410 corresponding to position ["m", 1] is retrieved and added to running sum 450. The process 500 continues until all weights have been added to the running sum 450.

Figure 6:
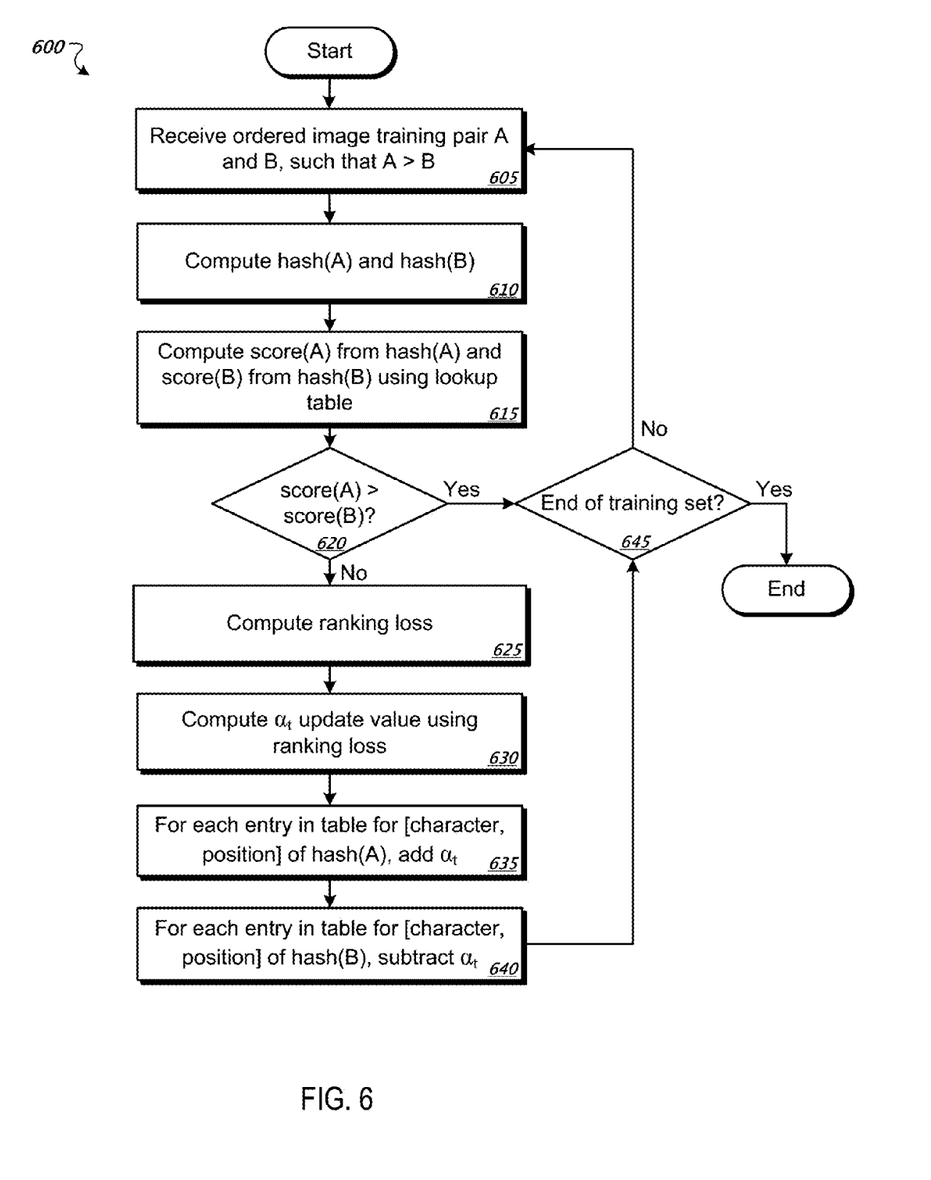
FIG. 6 is a flowchart of an example process for training a ranking model by using hashes of image data.

FIG. 6 is a flowchart of an example process 600 for training a ranking model by using hashes of training images. The process will be described as being performed by a computer system that includes one or more computers, e.g., the ranking engine described above. The ranking model can be trained in various ways, and numerous techniques can be used to compute weights of the lookup table. Once trained, the lookup table is used to calculate a score for a given image using its hash as input.

Training a ranking model includes defining a ranking loss function and performing a gradient descent (or any other optimization procedure) to obtain a model that minimizes the ranking loss. In some implementations, the loss function is a hinge loss and the optimization procedure is a variation of stochastic gradient descent.

Any machine learning algorithm that operates on a dot product of vectors (e.g., support vector machine methods) can be transformed with the kernel trick to operate on a string kernel over hashes. The transformation to a string kernel replaces the dot product of vectors with the number of hash characters that match between two hashes at respective hash positions. In other words, instead of computing dot products between vectors of real numbers corresponding to an image, a string kernel generates a hash for each image. Hashes between two images are then compared, and a sum of matching hash characters is computed. This approach provides a non-linear kernel that can be cast as linear without the need to store a set of training or support vectors.

The process 600 can be performed as an online method, in which the model is trained one instance at a time. In particular, this means that the model can be updated after every training pair. This allows the system to handle a much larger training set than offline methods that require computations on the entire training set at the outset.

The system receives a pair of ordered images, A and B, from a collection of training pairs (605). The order of the images can be any kind of ordering that the ranking model is being trained to learn. In some implementations, the order represents a relevance of each image to a textual query, e.g. "apples," such that image A is determined to be more relevant to the query "apples" than image B. Therefore, the score for image A as computed by the model should be higher than the score for image B. Because the ordering of the training pair indicated that image A is more relevant to the query than image B, a computed ranking loss will be higher if the score for image A turns out to be less than or equal to the score for image B.

In some other implementations, the order of the training pair is defined as the extent to which each image resembles another image. For example, image A may be identified as being more similar to another image than image B. In still other implementations, the order can be defined as something arbitrary, e.g., the beauty of each image as determined by human raters. In this example, the ordering of the image pair can indicate that image A is more beautiful than image B.

The system computes a hash of image A and a hash of image B (610). A hash function (e.g., hash function 220 of FIG. 2) can be used to convert the data of the images into respective hashes.

The system computes a score for image A and image B using a lookup table (e.g., lookup table 300 of FIG. 3) and their respective hashes (615). In some implementations, the lookup table contains all zeros upon initialization. The score of the hashes for the initial images will accordingly be zero.

In some implementations, a separate lookup table is trained for each set of training pairs, and each trained lookup table corresponds to a particular query. The query can be, for example, a textual query or an image query. In response to a received query, the corresponding lookup table can be used to score images in a collection of images.

The system determines whether the score for image A is higher than the score for image B (620). Because each training pair of images is ordered, the score for image A is expected to be higher than the score for image B. In some implementations, if the ranking model indicates that the score for image A is higher than the score for image B, the ranking model is not updated (branch to 645). In some other implementations, the model is updated after each image pair is processed, even if the score for image A is higher than the score for image B (branch to 625). In yet some other implementations, the model is updated only if the score of image A is not higher than the score for image B by a predefined ranking margin.

The system determines if more images remain to be processed in the training set (645). If images remain, the process 600 returns to 605 to process another pair of training images.

In some implementations, if the score for image A is less than or equal to the score for image B, the model is updated to correct for this incorrect scoring result. In some implementations, an update to the lookup table is performed according to:

$$w_{t+1} = w_t + \alpha_t(A-B),$$

where $w_t$ represents values of the lookup table at time t, $w_{t+1}$ represents values of the lookup table at time t+1 and updating the lookup table is performed by adding an update value $\alpha_t$ to each of image A's [character, position] lookup table entries and subtracting $\alpha_t$ from each of image B's [character, position] lookup table entries. In some implementations, $\alpha_t$ is based on a ranking loss, as explained below.

Updating the lookup table can be done using any machine learning algorithm, after adapting the algorithm to operate on a string kernel over hashes. In some other implementations, updating the lookup table is performed according to:

$$w_{t+1} = w_t + \eta(A-B) - \eta\lambda w_t,$$

where $\eta$ is a learning rate and $\lambda$ is a regularization parameter. In still some other implementations, an additional step may scale $w_{t+1}$ by $1/\sqrt{\lambda}$.

The system computes a ranking loss (625). A ranking loss is a computed value that indicates a degree of error when a pair of images is not correctly ranked. Ranking losses penalize the model and can be based on the difference between the score of each image. Ranking losses generally take the form:

$$\text{loss} = \max(0, m - f(\text{score}(A) - \text{score}(B))),$$

where m is a ranking margin, and f(·) is a function based on the difference between the scores of the images. The ranking margin represents a required minimum difference in scores in order for a training pair to be considered correctly ranked. In other words, even if the score of A is higher than the score of B, if the difference between the scores is not at least the ranking margin, the ranking loss will be nonzero and the ranking model is updated to correct for the nonzero ranking loss. In some implementations, f(·) is an exponential function that raises the difference between the scores to given power (e.g., 2). In some implementations, the ranking margin is 1 and the ranking loss for a pair of images is calculated as:

$$\text{loss} = \max(0, 1 - (\text{score}(A) - \text{score}(B))).$$

The system computes an update value $\alpha_t$ using the ranking loss (630). The update value can be used to update the weights (e.g., weight 322 of FIG. 3), in the lookup table. In some implementations, $\alpha_t$ is alternatively set to an arbitrary maximum value C, which can specify how aggressively, at a maximum, the lookup table 300 should be updated. The update value can be calculated as:

$$\alpha_t = \min\left(C, \frac{\text{loss}}{\|A-B\|^2}\right),$$

where $$\|A-B\|^2 = A \cdot A - A \cdot B - B \cdot A + B \cdot B.$$

As mentioned above, the string kernel transformation replaces the dot product computation for vectors with the number of hash characters that match between two hashes at respective hash positions. Therefore, the dot product (e.g. A·A) is defined over hashes as the number of characters that match between the two hashes in respective positions. For example, between example hashes "dog" and "dig," the dot product is two because the "d" and "g" match at their respective positions. Therefore, $$\|A-B\|^2 = \text{length}(A) + \text{length}(B) - 2*(A(i) == B(i)),$$

where $A(i) == B(i)$ indicates the number of characters that match between the hash for image A and the hash for image B at respective positions of the characters. The term length(A) indicates the length of the hash for image A and length(B) indicates the length of the hash for image B.

In some other implementations, $\alpha_t$ is computed as:

$$\alpha_t = \frac{\text{loss}}{\|A-B\|^2}.$$

In still some other implementations, $\alpha_t$ is computed as:

$$\alpha_t = \frac{\text{loss}}{\|A-B\|^2 - \frac{1}{2C}}.$$

The system adds $\alpha_t$ to each [character, position] entry for image A (635). If an entry in the lookup is uninitialized, the system can initialize that entry to $\alpha_t$. The system further subtracts $\alpha_t$ from each [character, position] entry for image B (640).

The system determines if more image pairs remain to be processed in the training set (645). If image pairs remain, the process 600 returns to 605 to process another pair of training images. If no image pairs remain, the process 600 ends.

After the ranking model has been trained on a set of training pairs of images, the scores for a number of images in a collection of images can be computed, for example, as described above with respect to FIG. 5.

Figure 7:
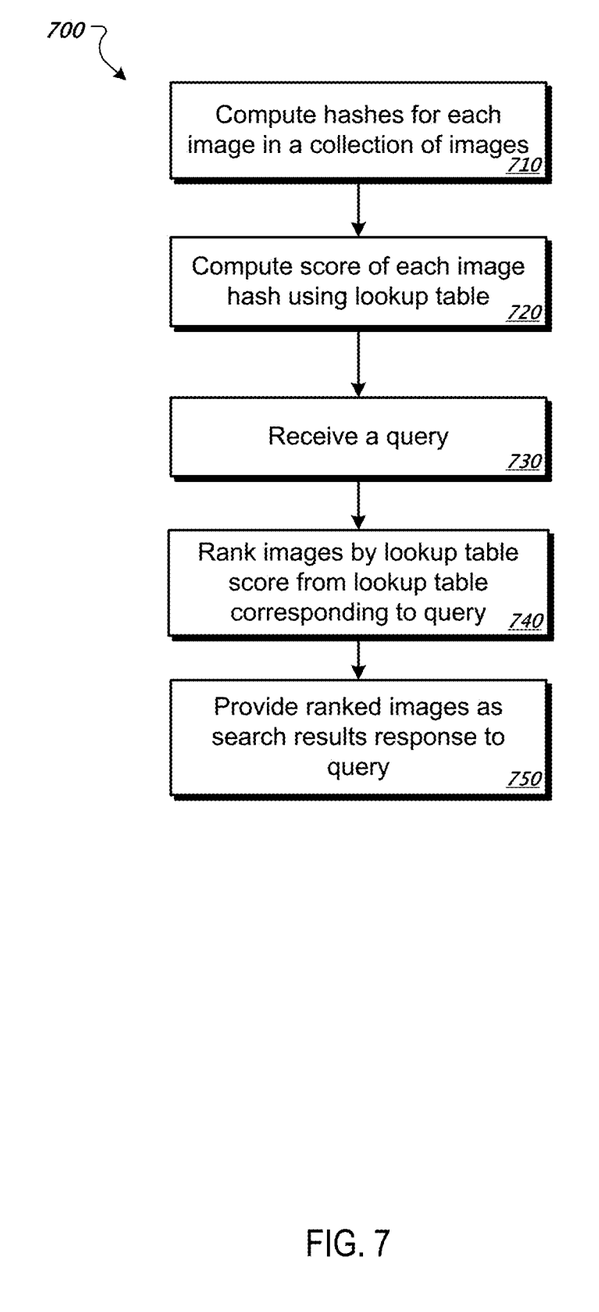
FIG. 7 is a flowchart of an example process for scoring a collection of images in response to a query.

FIG. 7 is a flowchart of an example process 700 for scoring a collection of images in response to a query. The process will be described as being performed by a computer system that includes one or more computers, e.g., the ranking engine described above.

The system computes a hash for each image in a collection of images (710). The hash can be computed using a hash function, for example, by the hash function 220 of FIG. 2.

The system computes a score for each image hash using a lookup table (720). In some implementations, the system generates a lookup table for each query. Therefore, for each image the system can compute a separate score for each lookup table. The score for each image can be computed either before or after a query is received by the system. The image scores for respective queries can be computed and stored on one or more storage devices.

The system receives a query (730). Types of received queries can include, for example, a textual query seeking relevant images, an image query seeking similar images, or an arbitrary query seeking an ordering of images reflecting ratings by humans.

The system ranks the images according to their respective lookup table scores calculated from the lookup table corresponding to the received query (740). In some implementations, the system retrieves a precomputed score for each image from one or more storage devices.

The system provides the ranked images as search results responsive to the query (750). In some implementations, a predetermined number of top-ranked results is provided, e.g., the top 10 results, and additional search results can be provided upon a subsequent user request.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital or analog computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a search query;
identifying a lookup table corresponding to the search query;
for each image in a collection of images:
generating an image hash for the image based on one or more features extracted from the image, wherein the image hash comprises a plurality of hash characters, and
computing a score for the image hash using the lookup table, wherein computing the score for each image hash comprises summing lookup table weights for each hash character of the plurality of hash characters, and wherein the lookup table includes a first index that corresponds to the lookup table value of each hash character, and a second index that corresponds to a position of each hash character in the image hash;
ordering the images by the score of each image hash; and
providing a group of the ordered images as search results responsive to the search query.

2. The method of claim 1, wherein summing a lookup table weights for each of a plurality of hash characters of the image hash comprises identifying the lookup table weight for each hash character by using the first index and second index.

3. The method of claim 1, wherein each hash character corresponds to a bit string.

4. The method of claim 1, wherein the search query is a text query and the ordered images represent a relevance of each image to the text query.

5. The method of claim 1, wherein the search query is an image query and the ordered images represent a similarity of each image to the image query.

6. The method of claim 1, further comprising:
receiving a second search query, the second search query being different from the search query;
identifying a second lookup table corresponding to the second search query, wherein the second lookup table is different from the lookup table; and
providing a group of ordered images as search results responsive to the second query based on scores computed for each image using the second lookup table.

7. A system comprising:
one or more computers; and
a computer-readable storage device having stored thereon instructions that, when executed by the one or more computers, cause the one or more computers to perform operations comprising:
receiving a search query;
identifying a lookup table corresponding to the search query;
for each image in a collection of images:
generating an image hash for the image based on one or more features extracted from the image, wherein the image hash comprises a plurality of hash characters, and
computing a score for the image hash using the lookup table, wherein computing the score for each image hash comprises summing lookup table weights for each hash character of the plurality of hash characters, and wherein the lookup table includes a first index that corresponds to the lookup table value of each hash character, and a second index that corresponds to a position of each hash character in the image hash;
ordering the images by the score of each image hash; and
providing a group of the ordered images as search results responsive to the search query.

8. The system of claim 7, wherein summing a lookup table weight for each of a plurality of hash characters of the image hash comprises identifying the lookup table weight for each hash character by using the first index and second index.

9. The system of claim 7, wherein each hash character corresponds to a bit string.

10. The system of claim 7, wherein the search query is a text query and the ordered images represent a relevance of each image to the text query.

11. The system of claim 7, wherein the search query is an image query and the ordered images represent a similarity of each image to the image query.

12. The system of claim 7, wherein the instructions when executed by the one or more computers further cause the one or more computers to perform operations comprising:
receiving a second search query, the second search query being different from the search query;
identifying a second lookup table corresponding to the second search query, wherein the second lookup table is different from the lookup table; and
providing a group of ordered images as search results responsive to the second query based on scores computed for each image using the second lookup table.

13. A computer storage medium encoded with a computer program, the program comprising instructions that when executed by one or more computers cause the one or more computers to perform operations comprising:
receiving a search query;
identifying a lookup table corresponding to the search query;
for each image in a collection of images:
generating an image hash for the image based on one or more features extracted from the image, wherein the image hash comprises a plurality of hash characters, and
computing a score for the image hash using the lookup table, wherein computing the score for each image hash comprises summing lookup table weights for each hash character of the plurality of hash characters, and wherein the lookup table includes a first index that corresponds to the lookup table value of each hash character, and a second index that corresponds to a position of each hash character in the image hash;
ordering the images by the score of each image hash; and
providing a group of the ordered images as search results responsive to the search query.

14. The computer storage medium of claim 13, wherein summing a lookup table weight for each of a plurality of hash characters of the image hash comprises identifying the lookup table weight for each hash character by using the first index and second index.

15. The computer storage medium of claim 13, wherein each hash character corresponds to a bit string.

16. The computer storage medium of claim 13, wherein the search query is a text query and the ordered images represent a relevance of each image to the text query.

17. The computer storage medium of claim 13, wherein the search query is an image query and the ordered images represent a similarity of each image to the image query.

18. The computer storage medium of claim 13, further comprising instructions to perform operations comprising:
receiving a second search query, the second search query being different from the search query;
identifying a second lookup table corresponding to the second search query, wherein the second lookup table is different from the lookup table; and
providing a group of ordered images as search results responsive to the second query based on scores computed for each image using the second lookup table.

* * * * *